(12) United States Patent
Na

(10) Patent No.: US 7,566,098 B2
(45) Date of Patent: Jul. 28, 2009

(54) SEAT RAIL STRUCTURE OF VEHICLE SEAT

(75) Inventor: Jae Hyun Na, Ansan (KR)

(73) Assignee: Hyundai Motor Company, Seoul (KR)

( * ) Notice: Subject to any disclaimer, the term of this patent is extended or adjusted under 35 U.S.C. 154(b) by 411 days.

(21) Appl. No.: 11/304,924

(22) Filed: Dec. 14, 2005

(65) Prior Publication Data

US 2007/0102616 A1    May 10, 2007

(30) Foreign Application Priority Data

Oct. 26, 2005    (KR) .................... 10-2005-0101193

(51) Int. Cl.
*A47C 1/00* (2006.01)
*F16M 13/00* (2006.01)
(52) U.S. Cl. ............... 297/341; 297/344.1; 248/429
(58) Field of Classification Search ............... 297/341, 297/344.1; 248/429
See application file for complete search history.

(56) References Cited

U.S. PATENT DOCUMENTS

| 4,742,983 | A | * | 5/1988 | Nihei | ............... | 248/429 |
| 4,770,386 | A | * | 9/1988 | Hessler et al. | ............... | 248/393 |
| 4,856,847 | A | * | 8/1989 | Kanai | ............... | 297/341 |
| 6,341,819 | B1 | * | 1/2002 | Kojima et al. | ............... | 297/341 |

FOREIGN PATENT DOCUMENTS

JP        2004-122799        4/2004

* cited by examiner

*Primary Examiner*—Anthony D Barfield
(74) *Attorney, Agent, or Firm*—Morgan, Lewis & Bockius LLP

(57) ABSTRACT

Disclosed is a seat rail structure of a vehicle seat. The seat rail structure may include a lower rail, an upper rail for supporting a seat, a seat bracket connected to the upper rail, and a spring assembly. In one embodiment, the seat bracket is adapted to be separated from a spring structure by a stopper to increase the sliding range of the seat while maintaining spring tension.

10 Claims, 6 Drawing Sheets

SEAT RAIL STRUCTURE OF VEHICLE SEAT

CROSS-REFERENCE TO RELATED APPLICATION

This application claims priority to and the benefit of Korean Patent Application 10-2005-0101193 filed in the Korean Intellectual Property Office on Oct. 26, 2005, the entire content of which is incorporated herein by reference.

FIELD OF THE INVENTION

The present invention relates to a seat rail, and in particular to a seat rail which is capable of improving the maneuverability and commercial value of a seat by increasing the sliding range of the seat as well as imparting the convenient maneuverability of a walk-in structure on the seat.

DESCRIPTION OF THE RELATED ART

In general, a seat rail is mounted on the floor of an interior of a vehicle to allow the seat to slide forward and backward. In certain vehicles with second and third seat rows, such as SUVs (Sports Utility Vehicles) or MPVs (Multi Purpose Vehicles), the seat rail is typically greater than 500 mm and is also combined with a spring to assist with seat movement. When one or more seats are moved to their most forward position, a passenger can more conveniently enter or exit a vehicle. Additionally, this forward position of one or more seats allows for the stowing of large packages, e.g., a large piece of luggage.

A conventional seat rail structure generally includes a lower rail fixed on a vehicle floor; an upper rail (which is movable backward and forward in the longitudinal direction of the vehicle on the lower rail), with a seat being mounted on the upper rail; a spring associated with the movement of the seat; a first anchoring member for anchoring one end of the spring to the lower rail; and a second anchoring member for anchoring the other end of the spring to the upper rail. In general, a user can manipulate a lever (not shown) which allows the seat to be moved forward or backward in the vehicle so that a passenger can conveniently get in or out of the vehicle, or to provide a space for loading or storing large items.

When a spring is secured to the seat rail, the sliding range of the seat is restricted by the spring. Additionally, where the seat rail is short, no spring can be attached (resulting in seat movement by human force only), and where the seat rail is too long, a sagging phenomenon will occur in the spring allowing it to become disengaged. Also, current spring assisted structures are aesthetically unpleasant since the spring is projected and visible above the rail of the walk-in structure.

SUMMARY OF THE INVENTION

The present invention provides a seat rail operable to increase the sliding range of a seat, as well as improving the convenience of maneuverability of the seat through the use of a spring structure, in which the spring structure is adapted to be separable from the seat. By using the seat rail structure disclosed, a seat can be slid to an end of the lower rail because the spring is separated from the seat. Consequently, it is possible to achieve the effects of increasing the sliding range as well as the maneuverability of the seat.

In one aspect, the present invention is directed to a seat rail structure comprising a first lower rail which may be fixed to a floor of a vehicle; a second upper rail connected to a seat and slidingly movable along the first rail in a forward and rearward direction; a first bracket mounted on the upper rail; a second bracket releasably connected with the first bracket and supporting one end of the coil spring through a first connection hole; a third bracket mounted on the lower rail and supporting the other end of the coil spring through a second connection hole; and a fourth bracket mounted on the lower rail between the second bracket and the third bracket to act as a stopper to block the forward movement of the second bracket. In a preferred embodiment, the second bracket is not permanently fixed to either the first or second rails.

In one embodiment, the first bracket may be a seat bracket for supporting a seat, the second bracket may be spring bracket, and the fourth bracket may be a stopper. The spring bracket preferably supports one end of a spring and is movable in a forward and rearward direction. A fixed bracket, which may be mounted to the first lower rail, may support a second end of the spring. In one embodiment, the seat bracket may be mounted to the second upper rail and the stopper may be mounted to the lower rail.

In other aspects the first bracket or seat bracket comprises a first anchoring member and the fourth bracket or stopper comprises a second anchoring member. The second bracket or spring bracket may be configured to comprise at least one fixing hole operable to releasably engage the first and second anchoring member, and more preferably at least two fixing holes with one each to receive the first and second anchoring member. The first bracket or seat bracket may comprise a third anchoring member and the fourth bracket or stopper may comprise a fourth anchoring member. The second bracket or spring bracket may be configured and operable to releasably engage at least one of the third and fourth anchoring members. In another embodiment, a track cover may be provided to at least partially conceal the spring.

In another aspect, the present invention is directed to a seat rail structure comprising a first bracket mounted at a first location on a first rail, the first bracket supporting a first end of a spring; a stopper mounted at a second location on the first rail; a seat bracket mounted to a second rail, the second rail connected to a seat; a spring bracket supporting a second end of the spring, the spring bracket operable to engage at least one the seat bracket and the stopper, wherein the seat bracket being engaged with the stopper enables the second bracket to disengage from the seat bracket.

In other aspects the seat bracket comprises a first anchoring member and the stopper comprises a second anchoring member, and the spring bracket comprises at least one fixing hole operable to releasably engage the first and second anchoring member; the second bracket comprises a third anchoring member and the stopper comprises a fourth anchoring member, and the spring bracket is operable to releasably engage at least one of the third and fourth anchoring member; and a track cover.

In another aspect, the present invention is directed to a seat sliding structure comprising a seat bracket connected to a seat, the seat adapted to move at least forward; a first bracket connected to a rail; a spring assembly connected to the first bracket and releasably connected to the seat bracket, wherein at one time the seat moves forward with assistance of the spring assembly, and at another time moves forward without the assistance of the spring assembly. In another aspect, the spring assembly comprises a spring and a spring bracket.

In another aspect, the present invention is directed to a seat structure allowing movement of a seat on a rail comprising a first bracket fixed to the rail; a spring bracket; a spring having a first end attached to the first bracket and a second end attached to the spring bracket; a stopper fixed to the rail, the stopper disposed between the first bracket and the spring bracket; and a seat bracket mounted to the seat, the seat bracket engaged with the spring bracket during a first portion of forward motion of the seat and disengaged from the spring bracket during a second portion of forward motion of the seat.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
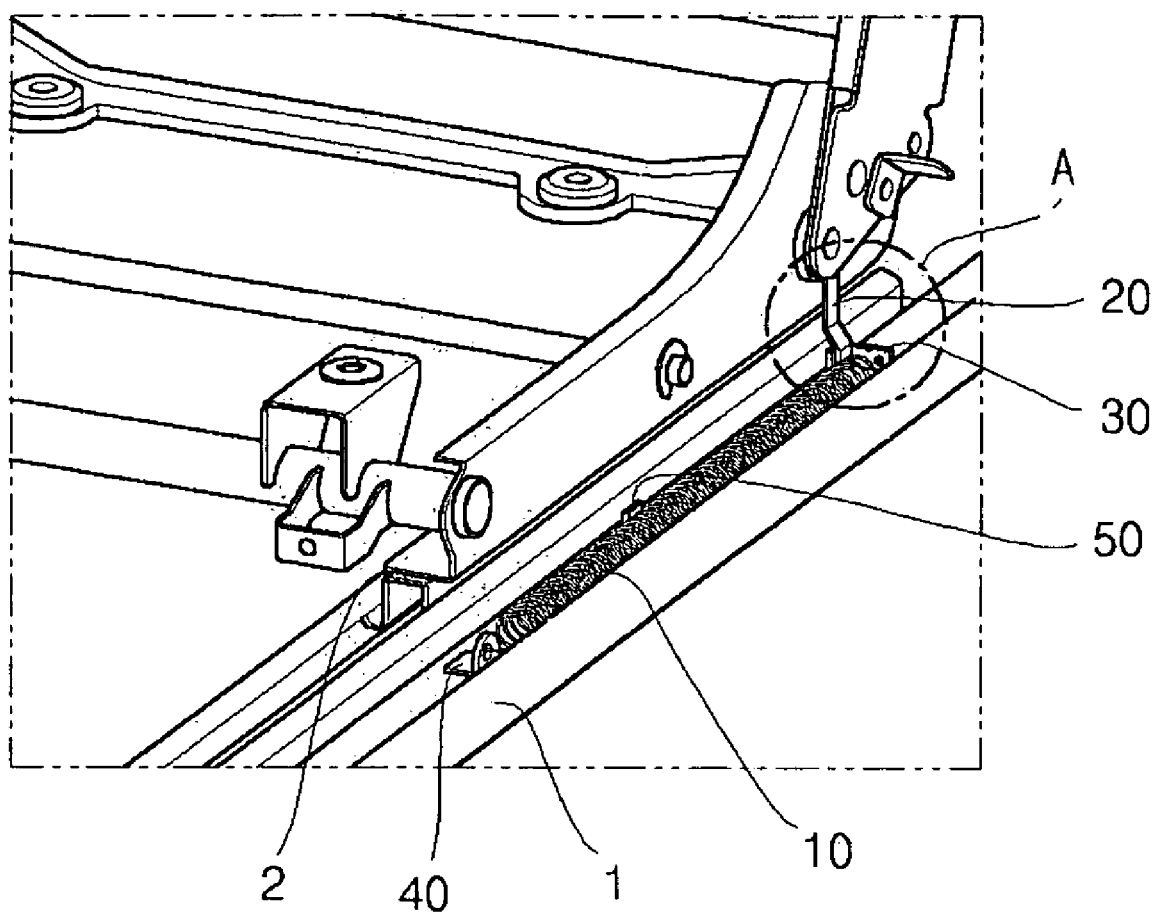
FIG. 1 is a perspective view showing one embodiment of a disclosed seat rail structure according to principles of the present invention.

In the Figures and the following description the same reference numerals are used to designate the same or similar components. As shown in FIG. 1, the seat rail structure comprises a lower rail 1, an upper rail 2, a spring 10, a first bracket 20, a second bracket 30, a third bracket 40, a fourth bracket 50. Also shown is portion A, described in detail below.

Figure 2:
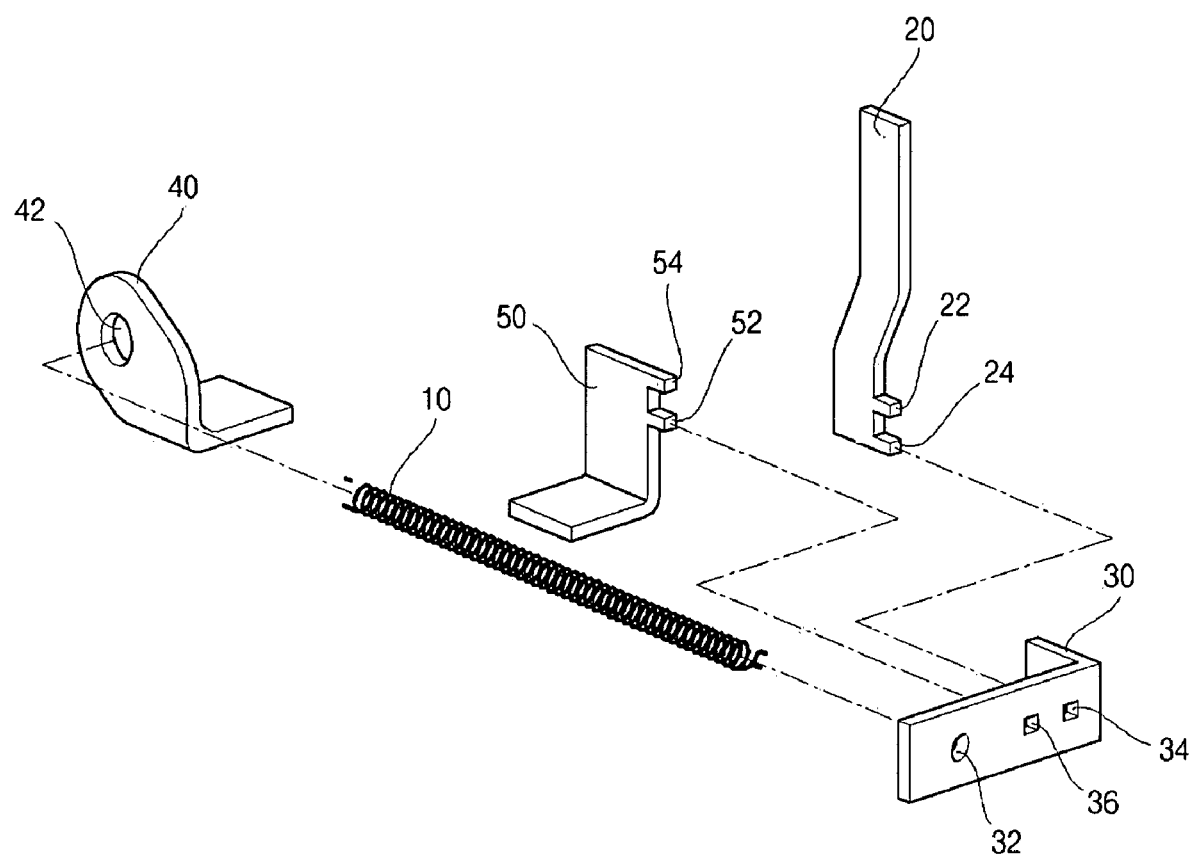
FIG. 2 is an exploded perspective view of various components of one embodiment of the disclosed seat rail structure.

One end of spring 10 is connected to third bracket 40, which is preferably mounted on the lower rail 1 and is adapted to support one end of spring 10 through second connection hole 42 (see FIG. 2). The other end of spring 10 is connected to first bracket 20 mounted on an upper rail 2. Lower rail 1 and upper rail 2 are adapted to allow a seat (not shown) to be moved forward and backward (with respect to the longitudinal axis of a vehicle). Spring 10 provides an elastic force that can be adapted to assist with seat movement. In the following possible embodiments, the spring preferably is at its resting state when the seat is in the most forward position, such that any tension in the spring when the seat is rearward will assist in moving the seat forward. However, in other possible embodiments, spring 10 may alternatively be arranged to bias the seat rearward.

In one embodiment, a seat (not shown) is preferably mounted to upper rail 2, as is first bracket 20. First bracket 20 is preferably configured and adapted to releasably connect to second bracket 30. Referring additionally to FIG. 2, in one possible embodiment, second bracket 30 is provided with two fixing holes, first fixing hole 34 and second fixing hole 36, as well as a connection hole 32 for connecting one end of the coil spring 10. Additionally, first bracket 20 has a first anchoring member 22 (complimentary configured and adapted to be inserted into fixing hole 34) and a second anchoring member 24, (adapted to guide and facilitate connecting first bracket 20 with second bracket 30).

Figure 3:
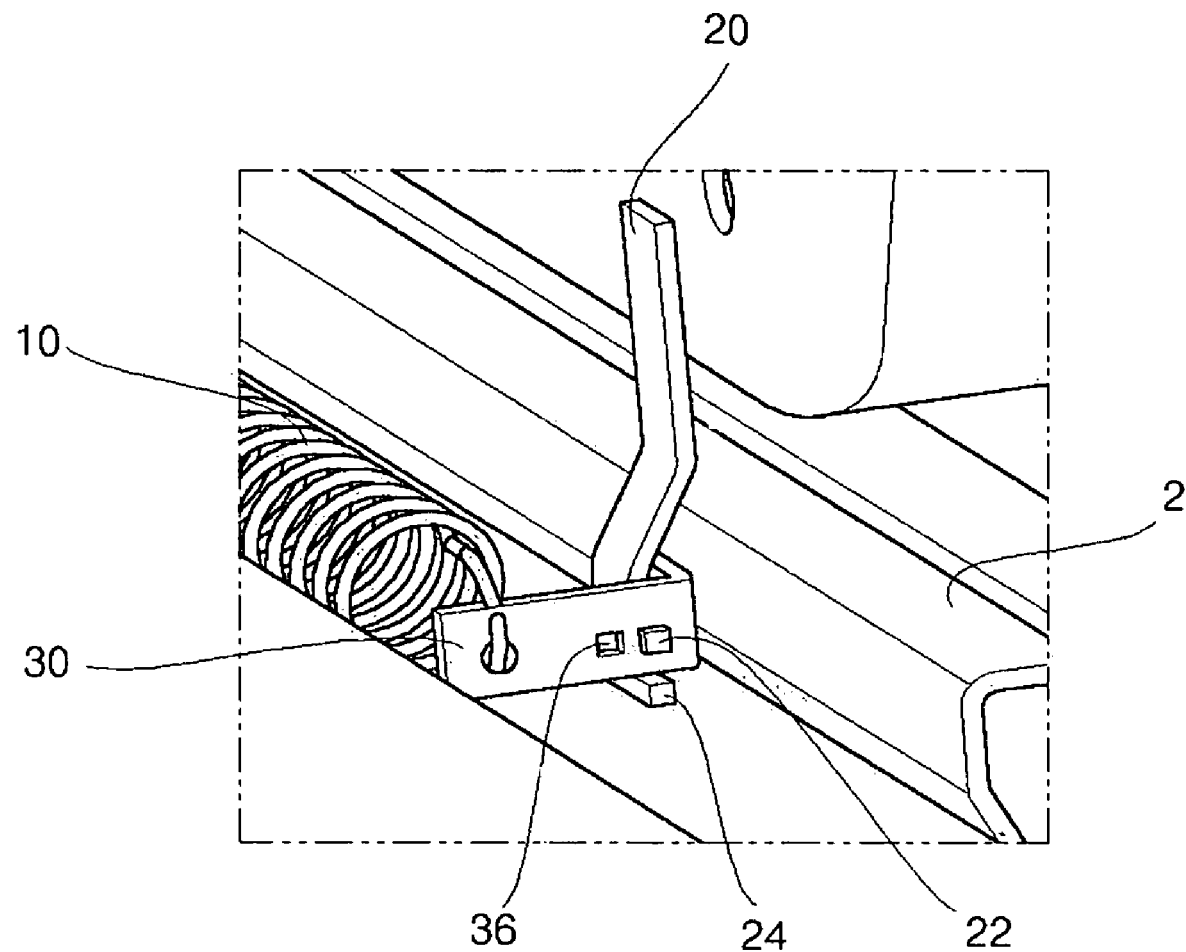
FIG. 3 is a magnified perspective view of portion A as shown in FIG. 1.

As shown in FIG. 3, first anchoring member 22 is releasably fitted in first fixing hole 34, and second anchoring member 24 is releasably engaged with the bottom of the second bracket 30. In one embodiment, when a lever (not shown) is not manipulated, first bracket 20 is operable to support the second bracket 30 with first anchoring member 22 and the second anchoring member 24. When the lever is manipulated, first bracket 20 and second bracket 30 (which are releasably connected) are jointly moved to the location where fourth bracket 50 is mounted.

Figure 5A:
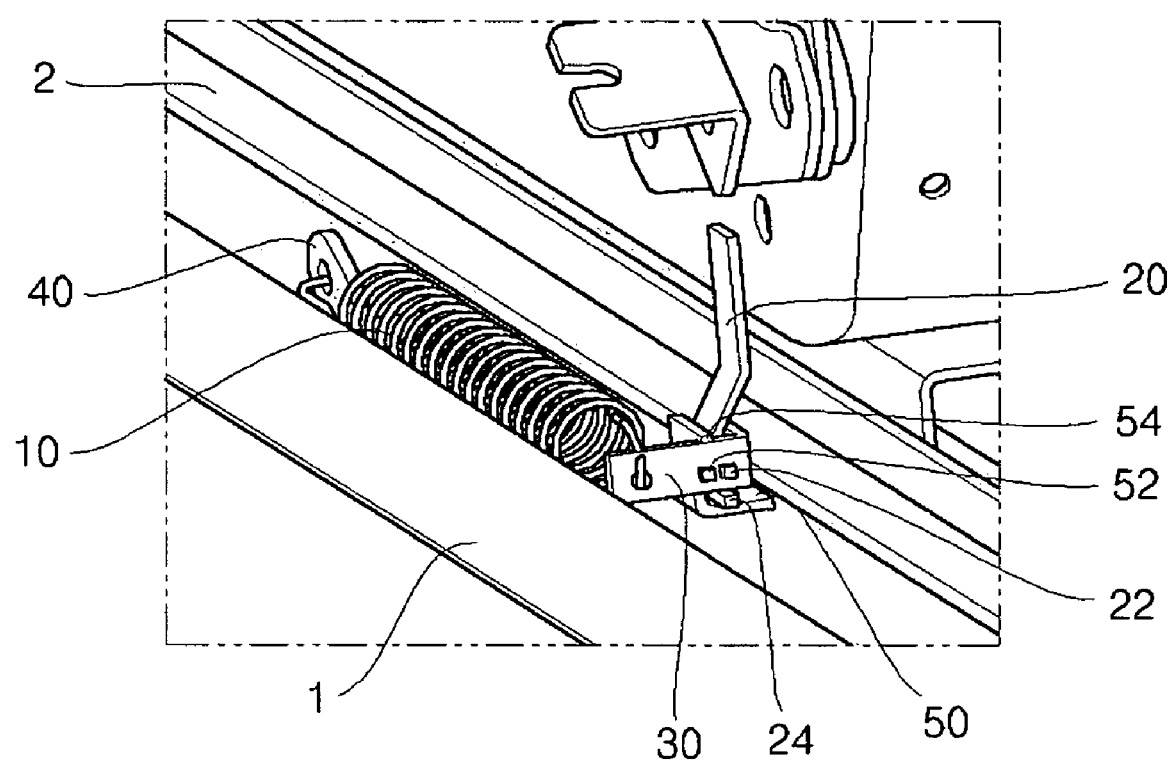
FIGS. 5a and 5b illustrate operating states of one embodiment of the disclosed seat rail structure.

As shown in FIG. 2, fourth bracket 50 has a third anchoring member 52 adapted to be releasably fitted in second fixing hole 36 in the second bracket 30, and a fourth anchoring member 54 adapted to be releasably engaged with the top of the second bracket 30. In particular, third anchoring member 52 and fourth anchoring member 54 are configured and adapted to connect with second bracket 30 as shown in FIG. 5a. Upon connecting fourth bracket 50 with second bracket 30, the connection between first bracket 20 and second bracket 30 is released (see FIG. 5b). At this time, although first bracket 20 (along with the upper rail 2) may continue to move toward the end of lower rail 1, second bracket 30 is prevented from further movement by fourth bracket 50.

Fourth bracket 50 is preferably mounted on lower rail 1 between second bracket 30 and third bracket 40, thereby serving to block the forward movement of the second bracket 30. As will be recognized by those skilled in the art, when fourth bracket 50 blocks the forward movement of the second bracket 30, and second bracket 30 is disconnected from first bracket 20, spring 10 maintains its natural state.

Figure 4:
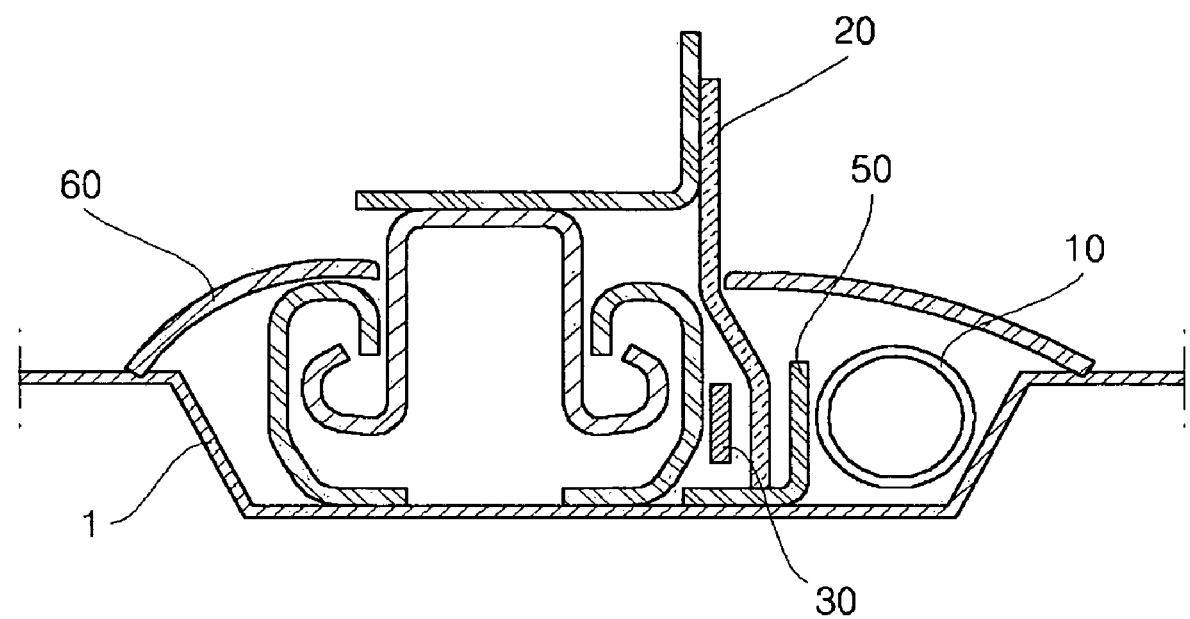
FIG. 4 is a cross-sectional view of the one embodiment of the disclosed seat rail structure.

As shown in FIG. 4, a removable track cover 60 may partially cover lower rail 1 and upper rail 2, and may also entirely cover seat rail structure, so that the seat rail structure is not outwardly exposed, thereby serving to improve the aesthetic look.

The operation of the inventive seat rail structure of a vehicle seat configured as described above is now described in connection with FIGS. 5a and 5b. In one embodiment, when a user manipulates a walk-in lever, a seat may be moved forward along lower rail 1 by the restoring force of the spring 10 which is in an expanded condition when the seat is in a rearward position. As the seat is drawn forward, so too are second bracket 30 and first bracket 20, which is releasably connected with the second bracket 30.

Figure 5B:
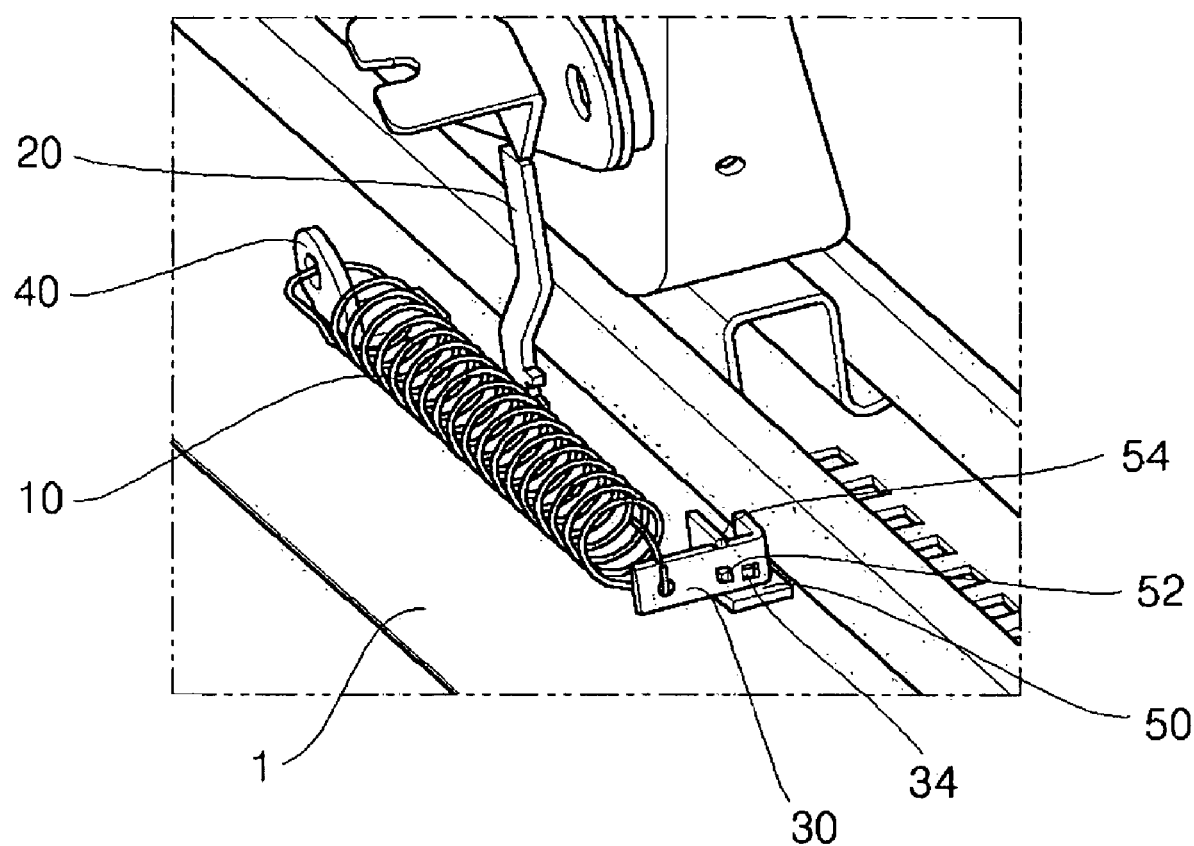

The seat is drawn forward to a point where second bracket 30 eventually arrives at the position of fourth bracket 50, as shown in FIG. 5a. Upon second bracket 30 contacting and connecting with the fourth bracket 50, i.e., through the connecting of third anchoring member 52 in second fixing hole 36 of second bracket 30, and fourth anchoring member 54 being engaged with the top of the second bracket 30, the connection between first bracket 20 and second bracket 30 is released. That is, as the seat is moved forward along lower rail 1, first bracket 20 may become separated from the second bracket 30, as shown in FIG. 5b to allow the seat to advantageously continue to move forward along lower rail 1 without being limited or affected by spring 10. Therefore, provided that sufficient length of the lower rail 1 is provided, the effective sliding range of the seat is increased. Second bracket 30 is still retained in the fixed connected state with the fourth bracket 50 by the force of the coil spring 10 since the spring is preferably not completely slack and still retains some spring tension when bracket 50 is positioned to engage bracket 30. This also advantageously ensures that spring 10 does not become disengaged from the spring support structures due to the remaining spring tension.

When the seat is then moved backward or rearward (e.g., returned to its previous rearward position or state), first bracket 20 re-connects with second bracket 30 (e.g., through the reconnecting of first anchoring member 22 and first fixing hole 34, and through second anchoring member 24 engaging with the bottom of second bracket 30), which in turn causes spring 10 to extend. First and second brackets 20, 30 are thus moved rearward in a connected state together again and spring 10 is expanded and fully retensioned.

If the inventive long-rail/walk-in structure described above is employed, a seat can be slid to an end of the lower rail because the coil spring is separated from the seat. Consequently, it is possible to achieve the effects of increasing the sliding range of the seat owing to the long-rail as well as improving the sliding maneuverability of the seat owing to the walk-in.

Although exemplary embodiments of the present invention has been described for illustrative purposes, those skilled in the art will appreciate that various modifications, additions and substitutions are possible, without departing from the scope and spirit of the invention as disclosed in the accompanying claims. Any description of orientation or position provided herein is merely for convenience in describing some possible embodiments of the invention and is not considered as limitations on the invention.

What is claimed is:

1. A seat rail structure comprising:
    a first rail;
    a second rail slidingly movable along the first rail for supporting a seat;
    a first bracket connected to the second rail;
    a second bracket releasably connected with the first bracket, the second bracket supporting a first end of a spring;
    a third bracket connected on the first rail and supporting a second end of the spring; and
    a fourth bracket positioned between the second and third brackets, the fourth bracket engaging the second bracket to block forward movement of the second bracket when the second rail slides along the first rail,
    wherein the first bracket comprises a first anchoring member and the fourth bracket comprises a second anchoring member, the second bracket configured to releasably engage the first and second anchoring member, and
    wherein the second bracket includes a first fixing hole and a second fixing hole to engage the first and second anchoring members, respectively.

2. The structure of claim 1, wherein the first and second anchoring members are projecting formed on the first and fourth brackets, respectively.

3. The structure of claim 1, wherein the fourth bracket is mounted on the first rail.

4. The structure of claim 1, wherein the first bracket is movable from a first position connected to the second bracket to a second position unconnected to the second bracket.

5. The structure of claim 4, wherein the fourth bracket is engaged with the second bracket when the first bracket is in the second position.

6. The structure of claim 1 wherein the fourth bracket comprises a third anchoring member and a fourth anchoring member, and wherein the second bracket is operable to releasably engage at least one of the third and fourth anchoring members.

7. The structure of claim 1 further comprising a track cover to at least partially conceal the spring.

8. A seat rail structure comprising:
    a first bracket mounted at a first location on a first rail, the first bracket supporting a first end of a spring;
    a stopper mounted at a second location on the first rail;
    a seat bracket mounted to a second rail for supporting a seat, the second rail connected to a seat; and
    a spring bracket supporting a second end of the spring, the spring bracket operable to engage at least one of the seat bracket and the stopper, wherein the seat bracket being engaged with the spring bracket enables the stopper to disengage from the spring bracket,
    wherein the seat bracket comprises a first anchoring member and the stopper comprises a second anchoring member, and wherein the spring bracket comprises at least one fixing hole operable to releasably engage the first and second anchoring member.

9. The structure of claim 8 wherein the second bracket comprises a third anchoring member and the stopper comprises a fourth anchoring member, and wherein the spring bracket is operable to releasably engage at least one of the third and fourth anchoring member.

10. The structure of claim 8 further comprising a track cover.

* * * * *